United States Patent
de Casillas

(10) Patent No.: US 6,347,232 B1
(45) Date of Patent: Feb. 12, 2002

(54) MESSAGE STORAGE SYSTEM FOR WIRELESS TELECOMMUNICATION DEVICE

(75) Inventor: Martha Vela de Casillas, Round Rock, TX (US)

(73) Assignee: Siemens Information and Communication Mobile, LLC, San Diego, CA (US)

( * ) Notice: Subject to any disclaimer, the term of this patent is extended or adjusted under 35 U.S.C. 154(b) by 0 days.

(21) Appl. No.: 08/992,209

(22) Filed: Dec. 17, 1997

(51) Int. Cl.[7] .............. H04B 1/38; H04B 7/00; H04M 1/00; G09F 3/00
(52) U.S. Cl. .............. 455/550; 455/66; 455/90; 455/347; 40/336; 379/447
(58) Field of Search .............. 455/90, 550, 575, 455/564, 556, 566, 569, 66, 347, 344; 379/344, 447, 433.13, 433.01; 364/708.1, 705.02, 705.03; D14/138, 254; D19/87, 1, 2, 26, 32, 33; 281/15.1; 160/35, 130, 84.01; 40/336–339

(56) References Cited

U.S. PATENT DOCUMENTS

| | | | | |
|---|---|---|---|---|
| 812,841 A | * | 2/1906 | Gilbert ...................... 40/338 |
| 1,054,465 A | * | 2/1913 | Sontheimer ................. 283/42 |
| 1,316,544 A | * | 9/1919 | Kristofek .................... 40/336 |
| 1,518,876 A | * | 12/1924 | Rosine ....................... 312/328 |
| 1,903,454 A | * | 4/1933 | Harris ........................ 40/338 |
| 2,432,760 A | * | 12/1947 | Higbee | |
| 2,541,270 A | * | 2/1951 | Mitnick ...................... 40/10.5 |
| D272,077 S | | 1/1984 | Halm ........................ D19/76 |
| D277,395 S | | 1/1985 | Ippen ........................ D19/76 |
| 4,828,289 A | * | 5/1989 | Korner ...................... 281/15.1 |
| D313,626 S | | 1/1991 | Halm ........................ D19/76 |
| 5,080,254 A | * | 1/1992 | Feer .......................... 221/33 |
| 5,151,946 A | * | 9/1992 | Martensson ................ 455/550 |
| 5,276,986 A | | 1/1994 | Thomas ..................... 40/336 |
| D347,857 S | | 6/1994 | Coe .......................... D19/65 |
| D350,568 S | | 9/1994 | Lucarelli ................... D20/43 |
| 5,359,182 A | * | 10/1994 | Schilling ................... 235/380 |
| D354,471 S | | 1/1995 | Moseley .................... D12/191 |
| 5,436,954 A | * | 7/1995 | Nishiyama et al. ......... 455/550 |
| D374,038 S | | 9/1996 | Gillespie ................... D19/87 |
| 5,584,054 A | * | 12/1996 | Tyneski et al. ............. 455/575 |
| D379,476 S | | 5/1997 | Tsui .......................... D19/76 |
| D379,994 S | | 6/1997 | Stratelak et al. ........... D14/254 |
| 5,719,936 A | * | 2/1998 | Hillenmayer ............... 455/447 |

FOREIGN PATENT DOCUMENTS

EP           0384894       * 2/1990

* cited by examiner

Primary Examiner—Vivian Chang
Assistant Examiner—Charles N. Appiah

(57) ABSTRACT

A wireless telecommunication device (10) and collapsibly retractable writing surface (50) therefor wherein the wireless telecommunication device includes an outer casing (12) and a collapsibly retractable writing surface (24) which is suitable for receiving and retaining written information thereon. The retractable writing surface (24) has an open position wherein the surface is disposed for receiving and retaining written information thereon and a closed position wherein the surface is fully retracted.

9 Claims, 3 Drawing Sheets

MESSAGE STORAGE SYSTEM FOR WIRELESS TELECOMMUNICATION DEVICE

BACKGROUND OF THE INVENTION

The use of cellular and other wireless telephones has become widespread in recent years. The convenience of carrying such telephones on one's person has increased due to improvements in the size, shape, weight, and cost of such phones, and due to the growing demand of people in the business community to be continuously accessible to clients and co-workers.

Before cellular phones became so commonplace, it generally suited one's needs to have a listing of often used telephone numbers situated proximately to each stationary telephone one used regularly, often in the form of address books or rolodexes. Such listings have been found to be less convenient, however, for use with cellular phones because of the need of assuring that the particular listing is present whenever and wherever the cellular phone may be used.

Efforts to alleviate this problem have included placing a writable panel on the cellular phone's exterior casing on which telephone numbers or speed dial numbers may be listed. However, the space available on such exterior surfaces, is usually quite limited; therefore, relatively few numbers can be listed in this manner. Furthermore, handwriting placed directly on the exterior of the cellular phone may render the phone undesirably unattractive.

Other attempts to alleviate the problem have been offered by some telephone manufacturers, including the so-called "flip-phone", a phone designed to have a hingeable panel which may overlap a portion of the face of the telephone to thereby cover the portion and protect the portion from the environment. The cover portion of the "flip-phone", when rotated away from the face of the phone, provides an additional surface on which telephone numbers or speed dial numbers can be written and/or displayed. The additional structure required by the "flip-phone", however, adds undesirable bulk and weight to the cellular phone, and therefore makes it less commercially appealing than would be a slimmer, lighter phone.

Yet another attempt to address the telephone number listing problem has been manifested in cellular phones which simply contain additional electronic memory, and possibly an additional display screen, so that one may electronically access a listing of previously stored telephone numbers or speed dial numbers. Obviously, these features may add significantly to the cost and fragility of the cellular phone, and in this respect may be undesirable.

SUMMARY OF THE INVENTION

In order to provide a lightweight, space-efficient means for keeping lists of telephone numbers at hand when using a wireless telecommunication device, applicant discloses and claims herein a wireless telecommunication device having an outer casing and a retractable writing surface attached to the casing. The surface is disposed for receiving written information thereon and includes a collapsibly foldable writing sheet suitable for receiving and retaining the written information thereon. The writing surface has an open position wherein the surface is substantially flat and disposed for receiving written information thereon and a closed position wherein the surface is substantially collapsed. The retractable writing surface further includes a member having first and second ends, the member being pivotally attached at the first end to the outer casing, and the member being substantially attached along its length to an edge of a writing sheet such that rotation of the member about the pivotally attached first end swings the collapsibly foldable writing surface between the open and closed positions.

Also disclosed and claimed is a collapsible writing surface for attachment to a wireless telecommunication device having an outer casing. The collapsible writing surface has a closed position wherein the writing surface is fully retracted and an open position wherein the writing surface is fully extended. The writing surface includes a series of n generally triangular panels, each of the generally triangular panels having a generally linear leading edge, a generally linear trailing edge, and a perimetrical edge intersecting the leading and trailing edges. Each of the leading edges of the panels adjoins the trailing edges of subsequent panels in the series for all the interior panels of the series.

Thus, the inventive wireless telecommunication device and collapsible writing surface enables the user to keep with him, in tandem with his cellular telephone, his most commonly used or important telephone numbers. The writing surfaces may be easily detachable and replaceable by the user to increase the quantity of telephone numbers or other information which may be accessible wherever the wireless telecommunication device is carried.

DETAILED DESCRIPTION OF THE INVENTION

Figure 1:
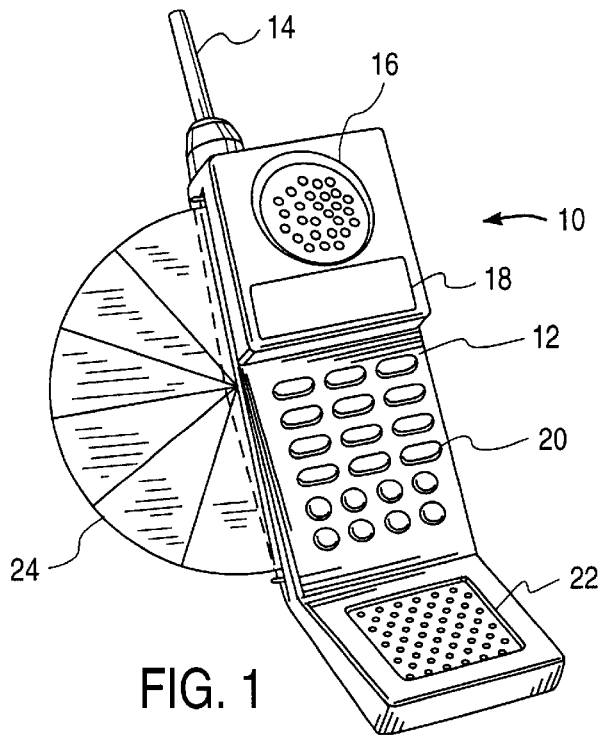
FIG. 1 is a perspective view of a wireless telecommunication device in accordance with one embodiment of the invention wherein the collapsibly retractable writing surface is abstractly shown in an open position.

Referring now to the drawings, FIG. 1 shows a wireless telecommunication device 10 in accordance with one embodiment of the invention. The wireless telecommunication device 10 may be a cellular or other wireless telephone, as are known in the art. In this embodiment, the wireless telecommunication device 10 has an outer casing 12 for housing the internal components of the phone, such as electronic circuitry, a speaker, and a microphone, for example. The wireless telecommunication device 10 may have an antenna 14 projecting from the top of the phone, a speaker portion 16 of the casing having holes for permitting audio output from the speaker to be heard by an ear placed adjacently to the speaker portion, a display screen 18, such as an LCD, for displaying information about the operating status of the wireless telecommunication device, an array of push keys or pushbuttons 20 for operating the wireless telecommunication device, and a microphone portion 22 of the casing having holes for permitting human voice to be heard and processed by a microphone housed within the casing 12.

Importantly, the inventive wireless telecommunication device has a collapsibly retractable writing surface, shown abstractly as 24 in FIG. 1, for receiving and retaining written information thereon. As shown in subsequent figures, the writing surface 24 has an open position wherein the surface is disposed for receiving and retaining written information thereon and a closed position wherein the surface is fully retracted.

Figure 7:
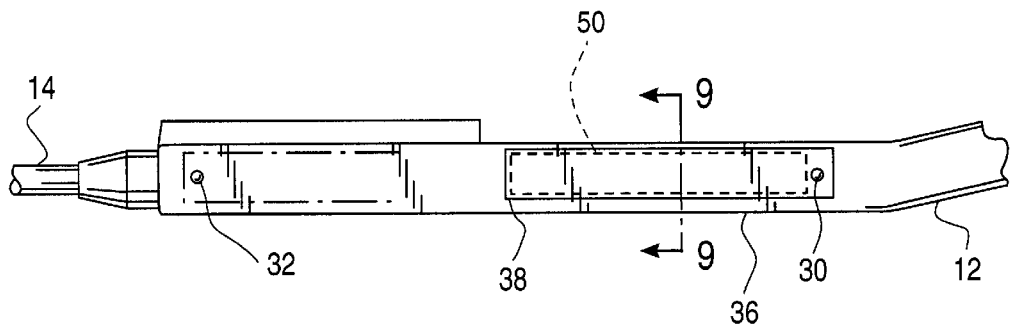
FIG. 7 is a broken side view of the wireless telecommunication device shown in FIG. 2.
Figure 8:
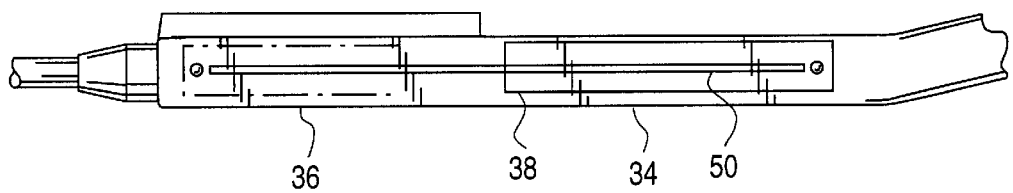
FIG. 8 is a broken side view of the wireless telecommunication device shown in FIG. 3.
Figure 9:
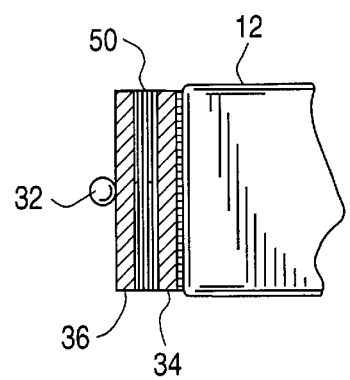
FIG. 9 is a cross-sectional view taken from FIG. 7 along the line 9—9.
Figure 10:
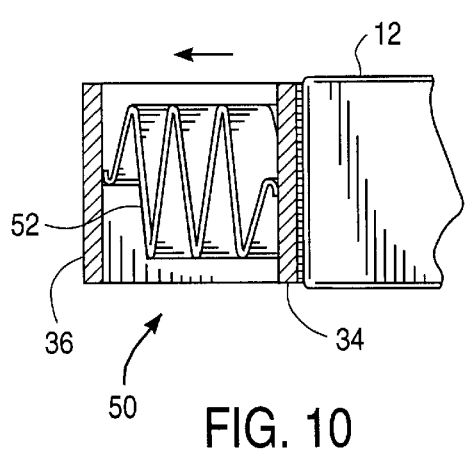
FIG. 10 is a cross-sectional view akin to that shown in FIG. 9 wherein the retractable writing surface is shown in a position between the closed position and open position, as where the surface is being moved from the closed position to the open position.

FIGS. 2–10 show a first embodiment of the inventive telephone and collapsible writing surface. In the first embodiment, the writing surface 24 includes a collapsibly foldable writing sheet 50, as seen in FIGS. 9 and 10. As seen particularly in FIGS. 3 and 10, the collapsibly foldable writing sheet 50 may be substantially semicircular sheet having folds defining generally triangular or wedge-shaped panels 52 which permit the sheet 50 to be collapsed in an accordion-like fashion.

Figure 2:
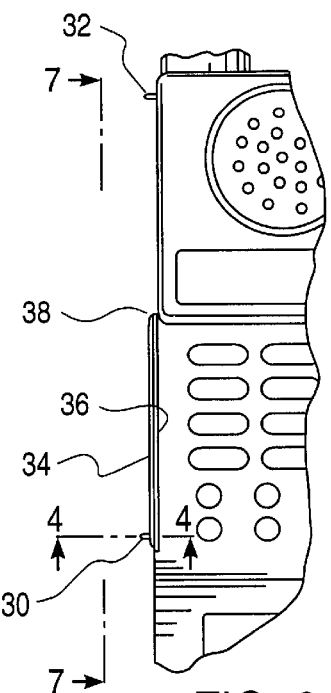
FIG. 2 is a broken front view of the inventive wireless telecommunication device in accordance with a first preferred embodiment wherein the retractable writing surface is shown in a closed position.
Figure 4:
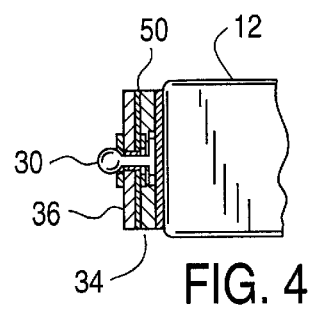
FIG. 4 is a cross-sectional view taken from FIG. 2 along the line 4—4.
Figure 3:
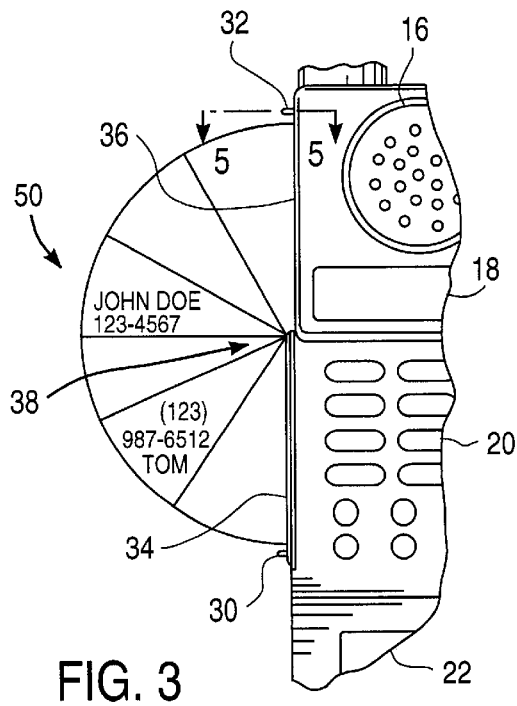
FIG. 3 is a broken front view of the wireless telecommunication device of FIG. 2 wherein the retractable writing surface is shown in an open position.

In the first embodiment, the writing surface 24 further includes a first radial plate 34 and a second radial plate 36 attached to the two ends of the generally semicircular writing sheet 50. The plates 34 and 36 are preferably sturdier than is the writing sheet 50, thereby enabling the user of the wireless telecommunication device to more easily grasp the writing surface and move R between its open and closed position. In FIG. 2, the radial plates 34 and 36 are shown as virtually adjacent, with the writing sheet 50 invisibly sandwiched therebetween. Each of the radial plates has a resilient hole at a fastening end, and the plates are mutually constrained into relative rotation at a pivot point 38. The resilient holes allow the radial plates to be fastened in conjunction with first and second retaining buttons 30 and 32, respectively. When the writing sheet 50 is in its closed position, as shown in FIG. 2, both radial plates 34 and 36 are fastened over the first retaining button 30 projecting from the exterior of the casing 12. FIG. 4 shows the retaining button 30 and the writing surface in closed position thereon in more detail. Because the writing sheet 50 is very thin, it can scarcely be seen in FIG. 4 sandwiched between the first and second radial plates 34 and 36.

Figure 5:
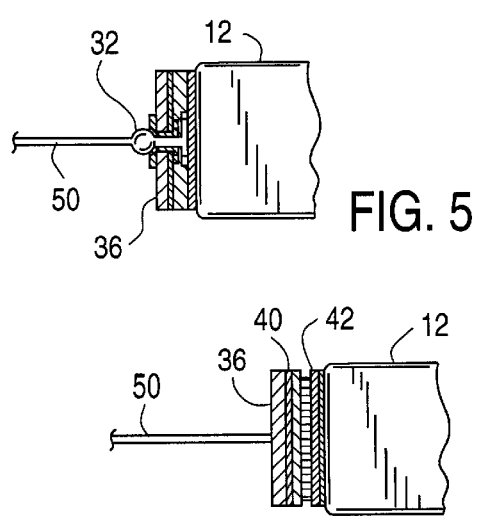
FIG. 5 is a cross-sectional view taken from FIG. 3 along the line 5—5.

FIG. 5 focuses on the second retaining button 32 when the writing sheet 50 is in the open position. In the open position, radial plate 36 is fastened over retaining button 32, while radial plate 34 remains fastened over retaining button 30. FIGS. 7 and 8 provide side views of the first embodiment, FIG. 7 showing the writing surface in its closed position and FIG. 8 showing the writing surface in its open position.

Figure 6:
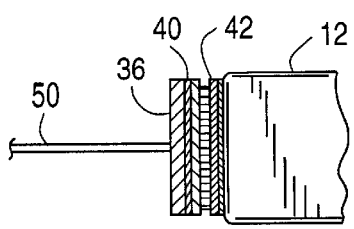
FIG. 6 is a cross-sectional view akin to that of FIG. 5 wherein an alternate embodiment of the invention having hook and loop strips is shown.

FIG. 6 shows an alternative to the first embodiment, wherein hook and loop strips are used, rather than retaining buttons, to retain the writing surface in its open and closed positions. In particular, the first radial plate 34 and a second radial plate 36 would each have an adhesive hook strip or loop strip, as known in the art, adhered to the exterior surface thereof for engaging a complimentary loop or hook strip on the exterior of the casing 12. FIG. 6 shows an example of such structure for the radial plate adhering to the casing 12 when the writing surface 24 is in its open position. In particular, the second radial plate 36 has along its exterior surface, a hook or loop strip 40 for engaging a complimentary hook or loop strip 42 adhered to the outer casing 12 of the wireless telecommunication device 10.

The pivot point 38 between the two radial plates 34 and 36, for either the first preferred embodiment or the alternative embodiment discussed above, may be any mechanism known in the art for constraining translation while permitting at least one dimensional rotation, such as a pin joint or a ball and socket arrangement, for example.

Figure 11:
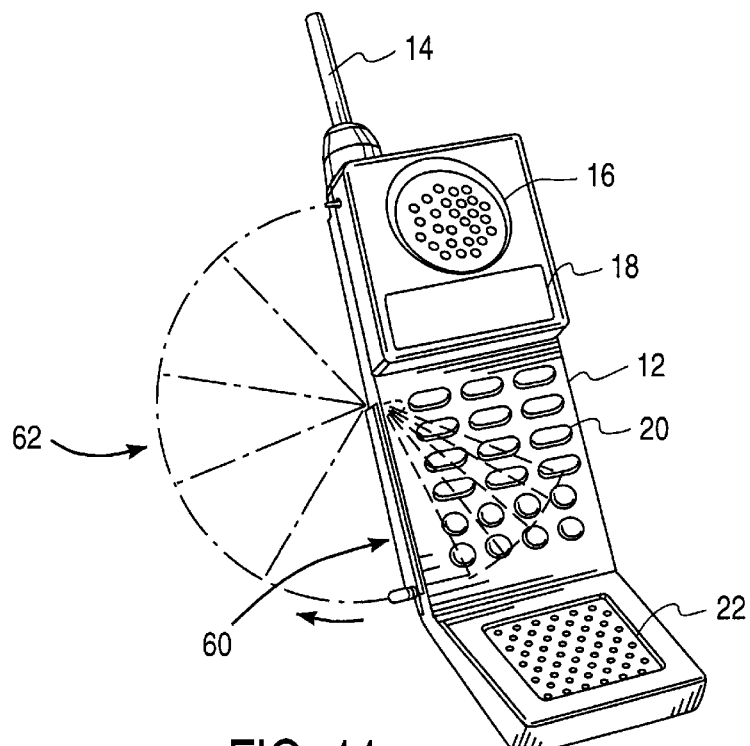
FIG. 11 is a perspective view of a wireless telecommunication device in accordance with a second embodiment of the invention wherein the retractable writing surface is abstractly shown in open position.
Figure 13:
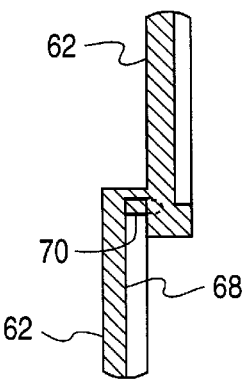
FIG. 13 is a cross-sectional view taken from FIG. 12 along the line 13—13.
Figure 12:
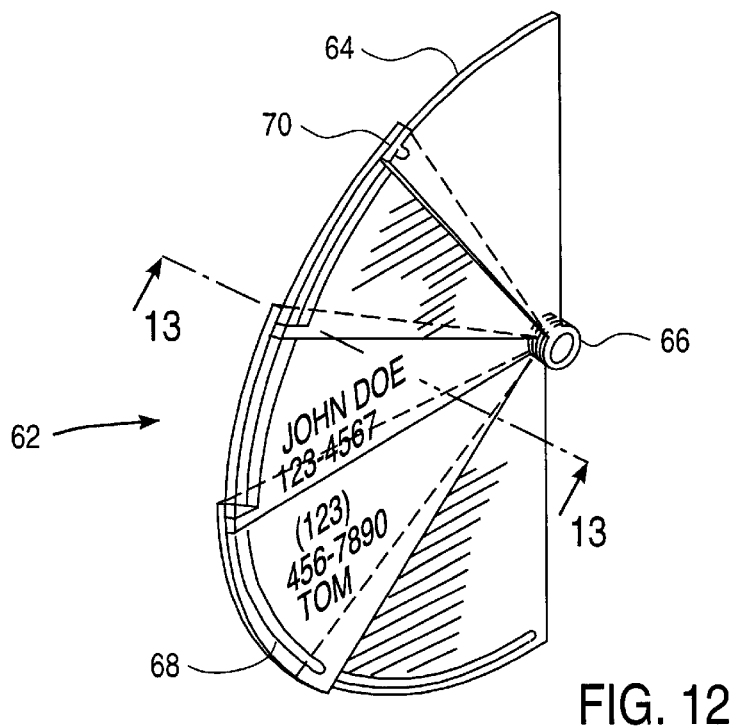
FIG. 12 is a perspective view of the retractable writing surface of the wireless telecommunication device shown in FIG. 11.

A second embodiment of the wireless telecommunication device and writing surface is shown in FIGS. 11 to 13. As shown in FIG. 11, the second embodiment may have a recess 60 in its casing 12 for permitting the collapsed writing surface 24 to be stored therein when in the closed position. The retractable writing surface 62 in the second embodiment includes serially adjoined telescoping writing boards 64 having consecutively shared edges when in the opened position and collapsibly foldable into a generally triangular or wedge-shaped multi-layered assembly. As seen in detail in FIGS. 12 and 13, the individual writing boards 64 are rotationally linked at a pivot ring 66 that may function like a pin joint. Additionally, the consecutive panels have alignment pins 70 for rotationally sliding in a sliding groove 68 near the perimeter of the generally semicircular writing surface. Cooperating pins 70 and grooves 68 permit each panel 64 to slide substantially over an adjacent panel with relative rotation centered at the pivot ring 66, ultimately permitting each writing board 62 to be generally aligned with the others in layered disposition within the recess 60 of the casing 12.

Thus, the collapsibly retractable writing surface is typically stored in its closed position. In this position, the wireless telecommunication device is easier to handle and the writing surface is not vulnerable to being erased, overwritten, torn or marred. Further, the wireless telecommunication device is more convenient to store in this position. When the operator of the wireless telecommunication device wishes to transcribe, edit, or access information on the writing surface, it must be moved into the open position. While this could be accomplished electronically within the scope of the invention, the above-described embodiments contemplate that the operator of the wireless telecommunication device would manually rotate open the second radial plate 36 (first preferred embodiment) or expand the telescoping writing board 62 (second preferred embodiment). Similarly, the writing surface, in either embodiment, is returned to its closed position by executing the reverse action.

From the foregoing, it will be appreciated that the invention provides a novel wireless telecommunication device, and in particular, a novel collapsibly retractable writing surface for receiving and retaining written information thereon for use in conjunction with the wireless telecommunication device. The invention is not limited to any of the embodiments described herein, nor to any particular embodiments. Specific examples of alternative embodiments considered to be within the scope of the invention include embodiments wherein the writing surface pivots about a pivot point conforming to any generally known in the art, wherein the collapsibly retractable writing surface, when in its closed position, is outwardly adjacent the outer casing of this phone or is housed within the general confines of the casing, wherein the first and second radial plates are shaped like any strut-like members generally known in the art, or are even absent entirely, wherein the retractable writing surface is generally attached to any outer surface of the wireless telecommunication device, and wherein the general shape of the telephone conforms to any generally known in the art. Other modifications to the described embodiments may also be made within the scope of the invention. The invention is defined by the following claims.

What is claimed is:

1. A wireless telecommunication device, comprising:
   an outer casing; and
   a collapsibly retractable writing surface suitable for receiving and retaining written information thereon, said retractable writing surface having an open position wherein said surface is disposed for receiving and retaining written information thereon and a closed position wherein said surface is fully retracted;
   wherein said writing surface comprises a collapsibly foldable writing sheet having a plurality of folds and wherein said writing sheet is substantially flat when said writing sheet is in said open position and said writing sheet is substantially collapsed when said writing sheet is in said closed position; said collapsibly foldable writing sheet being substantially semicircular, said folds defining generally triangular panels;
   wherein said writing sheet is pivotally attached by a pivoting attachment member to said outer casing such that said writing sheet may be pivoted between said open and closed positions by said pivoting attachment member.

2. A wireless telecommunication device in accordance with claim 1 wherein said writing sheet may be fixedly secured into a recess in one side of said outer casing when said writing sheet is in said closed position.

3. A wireless telecommunication device, comprising:
   an outer casing; and
   a collapsibly retractable writing surface suitable for receiving and retaining written information thereon, said retractable writing surface having an open position wherein said surface is disposed for receiving and retaining written information thereon and a closed position wherein said surface is fully retracted;
   wherein said writing surface comprises a collapsibly foldable writing sheet having a plurality of folds and wherein said writing sheet is substantially flat when said writing sheet is in said open position and said writing sheet is substantially collapsed when said writing sheet is in said closed position;
   wherein said writing sheet is pivotally attached to said outer casing such that said writing sheet may be pivoted between said open and closed positions; and
   further comprising a member having first and second ends, said member being pivotally attached at said first end to said outer casing, said member being substantially attached along its length to an edge of said writing sheet such that rotation of said member about said pivotally attached first end swings said writing sheet between said open and closed positions.

4. A wireless telecommunication device in accordance with claim 3 wherein said second end of said member is detachably connected to said outer casing when said writing surface is in said open position.

5. A wireless telecommunication device, comprising:
   an outer casing; and
   a collapsibly retractable writing surface suitable for receiving and retaining written information thereon, said retractable writing surface having an open position wherein said surface is disposed for receiving and retaining written information thereon and a closed position wherein said surface is fully retracted;
   wherein said writing surface is pivotally attached to said outer casing such that said writing surface may be pivoted between said open and closed positions; via an integrated pivoting member having first and second ends, said member being pivotally attached at said first end to said outer casing, said member being substantially attached along its length to an edge of said writing sheet such that rotation of said member about said pivotally attached first end swings said writing sheet between said open and closed positions;
   wherein said writing surface comprises at least two serially adjoined panels wherein an overlying panel substantially overlies an overlied panel when said writing surface is in said closed position; and
   wherein said overlying and overlied panels mutually include guidance means for guiding the relative positions of said overlying and overlied panels.

6. A wireless telecommunication device in accordance with claim 5 wherein said guidance means comprises an alignment pin on one of said serially adjoined panels and a groove within another of said serially adjoined panels.

7. A wireless telecommunication device in accordance with claim 5 wherein said writing surface may be fixedly secured into a recess in one side of said outer casing when said writing surface is in said closed position.

8. A collapsible writing surface for attachment to a wireless telecommunication device having an outer casing, said collapsible writing surface having a closed position wherein said writing surface is fully retracted and an open position wherein said writing surface is fully extended and disposed for receiving and retaining written information thereon, said writing surface comprising:
   a series of generally triangular panels mutually constrained for rotational movement at a pivot point of said triangular panels, said panels lying in substantially parallel planes whereby said panels may be rotated between a closed position wherein said panels are generally aligned in a stacked overlying relationship and an open position wherein each of said triangular panels substantially shares one of its edges with an adjacent panel in said series.

9. A wireless telecommunication device, comprising:
   an outer casing; and
   a collapsibly retractable writing surface suitable for receiving and retaining written information thereon, said retractable writing surface having an open position wherein said surface is disposed for receiving and retaining written information thereon and a closed position wherein said surface is fully retracted;
   wherein said writing surface comprises a collapsibly foldable writing sheet and wherein said writing sheet is substantially flat when said writing sheet is in said open position and said writing sheet is substantially collapsed when said writing sheet is in said closed position;

wherein said writing sheet is pivotably attached to said outer casing such that said writing sheet may be pivoted between said open and closed positions by a member having first and second ends, said member being pivotally attached at said first end to said outer casing, said member being substantially attached along its length to an edge of said writing sheet such that rotation of said member about said pivotally attached first end swings said writing sheet between said open and closed positions; and wherein said writing sheet comprises a plurality of generally triangularly shaped panels having consecutively shared edges, said sheet being collapsibly foldable along said shared edges.

* * * * *